Patented Dec. 7, 1937

2,101,099

UNITED STATES PATENT OFFICE 2,101,099

MANGANESE COMPOUNDS OF NUCLEO-
TIDES AND OF THEIR HYDROLYTIC DE-
COMPOSITION PRODUCTS

Simon L. Ruskin, New York, N. Y., assignor to
Frances R. Ruskin, New York, N. Y.

No Drawing. Application December 27, 1932,
Serial No. 648,993

8 Claims. (Cl. 167—68)

This invention relates to organic compounds of manganese for use in the treatment of diseases, and more particularly to manganese compounds of nucleotides and their organic hydrolytic decomposition products which contain a pyrimidine configuration, and is a continuation of my prior Patent No. 1,885,949.

One object of this invention is to combine manganese with the isolated, lower hydrolytic decomposition products, of the nucleoproteins, such as the nucleotides, nucleosides or the purine or pyrimidine bases derived therefrom.

Another object of my invention is the preparation of these compounds by which a chemical combination of the manganese with the individual or isolated nucleotides, nucleosides or the purine or pyrimidine bases derived therefrom may be effected.

Still another object of my invention is the preparation of soluble compounds of manganese with the individual or isolated nucleotides, nucleosides or the purine and pyrimidine bases derived therefrom which compounds are soluble in water or physiological salt solution and contain 20 per cent of manganese or more.

A further object of my invention is the purification of the crude products obtained by combining manganese with the individual or isolated nucleosides, nucleotides, or the purine or pyrimidine bases derived therefrom, in order to produce readily soluble pure compounds which are especially suitable for application in human therapy.

By the expression "nucleoproteins" is to be understood proteins composed of an albuminous component of varying nature and a second characteristic component which consists of a polynucleotide, the so-called "nucleic acids". They are present in all cell nuclei and are obtained from animal substances as well as vegetable products, such as, e. g., blood corpuscles, yeast and others. They are weak acids and are decomposed by the action of dilute weak acids, or on treating with water alone, or by the action of pepsine-hydrochloric acid, whereby their albumen content is reduced or the albumen component is partly decomposed, yielding the so-called "nucleins".

The nucleins as well as the nucleoproteins are split up, e. g., by the action of acids, alkalies or ferments into polynucleotides, the so-called "nucleic acids" and albumen. These nucleotides are composed of polynucleosides and phosphoric acid and have been decomposed into (mono) nucleotides and dinucleotides, i. e., containing one, two or more nucleotide complexes but less than the number contained in the nucleic acids; the diand polynucleotides are probably formed by combination of the mononucleotides with each other by means of the phosphoric acid residue. The nucleotides are acids, and are decomposed by the action of hot water, ferments, acids or alkalies. Some mononucleotides were isolated from pancreas and from extract of meat, while polynucleotides containing four nucleotides were obtained from vegetable matter (yeast) or animal tissues (thymus, leucocytes, etc.).

The "nucleosides" which, in combination with phosphoric acid, form the nucleotides, are glucosides of various purine and pyrimidine bases, i. e., compounds composed of carbohydrates and these bases. They are obtained by the action of ferments and are finally decomposed into the various "purine" and "pyrimidine" bases, of which the following may be mentioned: thymin, cytosin, uracil, adenin and guanin. These final hydrolytic decomposition products have also been produced directly from nucleoproteins, nucleins and nucleotides by the action of acids or alkalies.

As the chemical constitution and the nomenclature of the compounds comprising the object of this invention are still in a state of considerable confusion, the following table is intended to give a clearer picture as to the scope of the invention and as to the relationship existing between all these compounds.

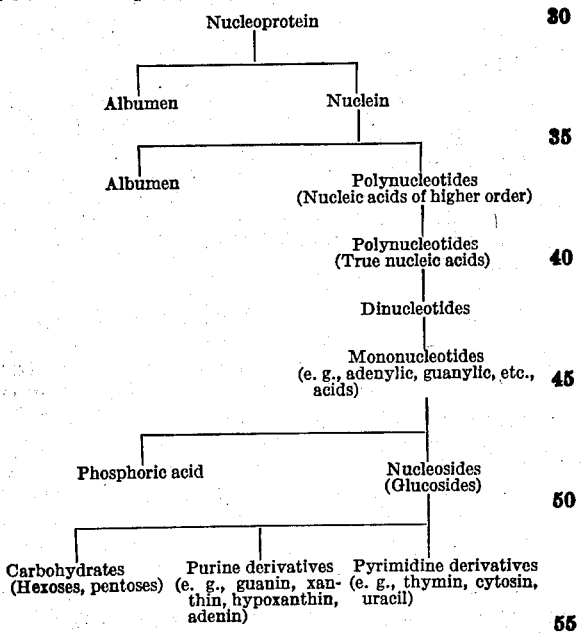

Of course, the invention comprises the use not only of the purine and pyrimidine compounds as obtained by hydrolytic decomposition of nucleoproteins, but also those compounds which are produced synthetically, i. e., in the reverse order of the table.

The invention will be further described with the aid of the following examples which, it should be understood, are presented merely by way of illustration and not as indicating the limits of the invention.

Example 1

To produce the manganese compound of a mixture of isolated mononucleotides, the latter are reacted with manganous salts in the following manner:

A mixture of mononucleotides consisting of guanylic and adenylic acids may be obtained, e. g., by hydrolysis of nucleic acid with ammonia in an autoclave at 115° C. and repeated crystallizations. Or, it may be produced by dissolving 50 grams of sodium nucleinate (obtained from yeast) in 1250 c. c. of water. Enough potassium hydroxide is added to make its concentration in the solution 1 percent, i. e., 12.5 grams of potassium hydroxide. After allowing this solution to stand at room temperature for 24 hours, the solution is slightly acidified by the addition of acetic acid and heated to about 70° C. on a water bath. Then it is run in a slight excess of a 25 percent solution of lead acetate, in order to precipitate the lead salts.

This mixture should be allowed to cool, inasmuch as the lead salts are somewhat soluble while hot. The precipitate is filtered with the aid of suction, the cake is thoroughly washed and suspended in boiling water. Hydrogen sulphide is passed into the suspension to free the nucleotides from the lead. This takes quite a time and should be continued until it is certain that all the lead is changed to the sulphide. The lead sulphide is separated by filtration and air is blown through the filtrate until all of the hydrogen sulphide is removed. It is usually necessary to filter again at this point, due to the formation of a slight turbidity caused by the precipitation of sulphur. The filtrate is distilled in vacuo, keeping the temperature below 50° C. The residue at the end of the distillation should be approximately 25 cc. Absolute alcohol is then added to precipitate the crude nucleotides. This precipitate consists of a mixture of guanylic, adenylic, and cytidylic acids.

The crude nucleotides are dissolved in twice their weight of hot water and nearly neutralized with ammonia. One and one-half parts of absolute alcohol, based on the weight of the nucleotides, are then added. The ammonium salt of guanylic acid is precipitated. This is filtered off, treated with absolute alcohol and dried in a desiccator.

Lead acetate is added to the filtrate of the ammonium salt of guanylic acid to precipitate the nucleotides which are present. The lead salt is filtered off in a similar manner to that given above, and the precipitate then suspended in boiling water. Hydrogen sulphide is led into the suspension to precipitate lead sulphide, thereby freeing the nucleotides. The filtrate is freed from hydrogen sulphide by passing a current of air through the solution, after which it is necessary to filter in order to free the filtrate from any precipitated sulphur. The filtrate is then distilled in vacuo, the temperature not being allowed to exceed 50° C. until 25 c. c. of a residue are obtained. Adenylic acid is precipitated by adding absolute alcohol.

In order to produce the manganese compound of the above described two mononucleotides, guanylic and adenylic acids, manganous sulphate is added to the solution of the mixed acids in water until additions cause no further precipitation. The precipitate is filtered off and washed with a small amount of water. It is then suspended in water and a saturated solution of sodium acetate is run in. Since the individual manganese nucleotides do not dissolve so readily as the crude manganese nucleinate, the residue is filtered off, after as much as possible has dissolved, and redigested with an additional amount of saturated sodium acetate solution in water. This procedure is continued until the filtrate shows no test for manganese nucleotide, i. e., no precipitation on addition of large amounts of alcohol.

The filtrates from all these extractions are then mixed and alcohol added to precipitate the manganese compounds completely. The precipitate is filtered off with suction and redissolved in water. It is necessary to repeat the extraction several times to get all the manganous nucleotides into solution. The filtrates are combined and precipitated with alcohol and this procedure of putting the nucleotide in solution and reprecipitation is continued until the desired degree of purity is obtained. The precipitate is sucked dry on a vacuum funnel, treated with absolute alcohol and placed in a desiccator to dry.

Thus a product is obtained which represents a mixture of the manganous compounds of the two mononucleotides, guanylic and adenylic acid, and which, in its pure state is soluble in water and physiological salt solution.

Obviously, the individual manganese nucleotides can be made as above described by employing only guanylic or adenylic acid, or any other single nucleotide.

Example 2

To produce the manganese compound of a final hydrolytic decomposition product of nucleoproteins, 50 grams of thymin are dissolved in a molecular proportion of sodium hydroxide and then an excess of a manganous acetate solution is added. The solution is filtered and the filtrate allowed to stand. The manganese compound of thymin is formed, filtered, washed with alcohol and dried over sulfuric acid. It is a snow white amorphous mass.

In all these examples, of course, the manganese compound may be obtained by adding the solution of the individual or isolated purine or pyrimidine decomposition product of a nucleoprotein to the solution of the manganese salt, instead of working as described. Instead of manganous sulphate, other manganous salts or also manganic salts or other compounds of manganese, capable of combining with the nucleotides, nucleosides, etc. may be used.

As starting materials there may be used the alkali salts of the nucleotides, nucleosides and their decomposition products or any other soluble compound of said products capable of combining with manganese, such as, e. g., the free acids themselves as described.

Separation of the crude precipitate as well as of the purified compound may be carried out in any suitable manner, by filtering, centrifuging, pressing through a filter press, decanting and any other suitable way.

Dissolving the crude product in water, in order to purify it, may also be done by extracting the precipitate in suitable extraction apparatus, by macerating or by any other suitable method, while stirring or shaking at ordinary or elevated temperature. Extraction is especially advisable in the case of the more difficultly soluble compounds of mononucleotides.

Instead of sodium acetate other salt solutions, such as potassium acetate, sodium chloride, sodium nitrate and others may be used.

As a precipitating agent one may employ benzene, ether or any other organic liquid in which the manganese compound produced is insoluble.

The drying may be effected at ordinary or increased temperature, in a vacuum or by means of an air current or in any other suitable manner whereby the manganese compound is not decomposed.

It has been found by bacteriological tests that the organic manganese compounds produced as above described inhibit the propagation of certain disease germs while at the same time solutions thereof do not have a deleterious effect on animal tissues, rendering them of great value as antiseptics and germicides.

Another great advantage consists in the fact that these combinations of manganese and the lower hydrolytic decomposition products of nucleoproteins have a very great stimulating effect upon the reticulo-endothelial system so that they are of great value in the treatment of diseases caused by deficiencies of this system, such as agranulocytosis, benzene poisoning, X-ray poisoning and various leucopenias incident to exhaustion of the reticulo-endothelial systems. Their application in these hitherto fatal diseases has effected a remarkable lowering of the mortality.

By the term "purines" as used herein, it is intended to cover purine and its alkyl, hydroxy and amino substitution products. By the term "pyrimidines" as used herein, it is intended to cover pyrimidine and its alkyl, hydroxy and amino substitution products.

Variations from the specific proportions and conditions described herein may be resorted to within the scope of the appended claims without departing from the spirit of the invention.

What I claim is:

1. The combination of manganese and an isolated mononucleotide.

2. The combination of manganese and two isolated mononucleotides, in the form of a reaction product of a manganese compound and the mononucleotides.

3. An organo-metallic compound containing manganese and an isolated member of the group consisting of mononucleotides and their organic hydrolytic decomposition products which contain a pyrimidine configuration in the molecule.

4. A therapeutic agent comprising a solution of two isolated manganese mononucleotides.

5. A therapeutic agent comprising a physiological salt solution of a manganese compound of an isolated mononucleotide.

6. A therapeutic agent comprising a solution of a manganese compound of an isolated mononucleotide having a purine structure.

7. A therapeutic agent comprising a solution of a manganese compound of an isolated mononucleotide having a pyrimidine structure.

8. A therapeutic agent comprising a solution of an isolated manganese mononucleotide injectable into the animal organism.

SIMON L. RUSKIN.